United States Patent
Tiemann

(10) Patent No.: US 6,659,714 B1
(45) Date of Patent: Dec. 9, 2003

(54) BAFFLE COOLING DEVICE

(75) Inventor: Peter Tiemann, Witten (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 10/048,822

(22) PCT Filed: Jul. 31, 2000

(86) PCT No.: PCT/EP00/07387

§ 371 (c)(1),
(2), (4) Date: May 22, 2002

(87) PCT Pub. No.: WO01/09553

PCT Pub. Date: Feb. 8, 2001

(30) Foreign Application Priority Data

Aug. 3, 1999 (EP) .............................. 99115330

(51) Int. Cl.⁷ ................................. F01D 5/14
(52) U.S. Cl. ..................................... 415/115
(58) Field of Search ................. 415/115, 116; 165/109.1

(56) References Cited

U.S. PATENT DOCUMENTS

| 4,642,024 A | 2/1987 | Weidner |
| 4,697,985 A | 10/1987 | Suzuki |
| 5,083,422 A | 1/1992 | Vogt |
| 5,467,815 A | 11/1995 | Haumann et al. |
| 5,649,806 A | 7/1997 | Scricca et al. |

FOREIGN PATENT DOCUMENTS

| DE | 26 28 807 | 1/1977 |
| EP | 0 624 757 A1 | 11/1994 |
| EP | 0 690 205 A2 | 1/1996 |
| EP | 0 905 353 A1 | 3/1999 |

Primary Examiner—Edward K. Look
Assistant Examiner—Kimya N McCoy
(74) Attorney, Agent, or Firm—Harness, Dickey & Pierce, P.L.C.

(57) ABSTRACT

A device for a component to be cooled includes a baffle cooling plate with at least one leadthrough for the cooling agent, arranged in front of the component. The baffle cooling plate can be impinged upon with a cooling agent. A deviation channel for the cooling agent is provided next to the leadthrough for the cooling agent and between the baffle cooling plate and the component to be cooled. The cooling agent enters the deviation channel after the component has been baffle-cooled. The cooling agent is collected and deviated by way of the deviation channel and can be specifically sued for further cooling purposes. The inventive device provides more efficient baffle cooling.

10 Claims, 3 Drawing Sheets

BAFFLE COOLING DEVICE

This application is the national phase under 35 U.S.C. §371 of PCT International Application No. PCT/DE00/07387 which has an International filing date of Jul. 31, 2000, which designated the United States of America, the entire contents of which are hereby incorporated by reference.

FIELD OF THE INVENTION

The invention relates to a device for a component to be cooled, upstream of which is arranged a baffle-cooling plate capable of being acted upon by a coolant and having a coolant leadthrough. A diversion duct for the coolant is provided, next to the coolant leadthrough, between the baffle-cooling plate and the component to be cooled.

BACKGROUND OF THE INVENTION

In a thermal machine, for example in a gas or steam turbine, the surfaces delimiting a space are subjected to high thermal load by a hot medium, for example a hot gas or steam. With a view to increasing the efficiency of the thermal machine, attempts are made, inter alia, to achieve as high a temperature of the hot medium as possible. On the one hand, therefore, it is of great importance to find suitable materials for the surfaces acted upon by the hot medium, especially materials with sufficient strength at as high temperatures as possible. On the other hand, it is important to cool these surfaces efficiently, so that high temperatures can be applied. In a gas turbine, the coolant necessary for cooling is conventionally extracted as cooling air from a compressor coupled to the turbine. In order to keep the efficiency loss accompanying this cooling-air extraction as low as possible, an intensive search for cooling concepts ensuring as efficient a use of coolant as possible is being conducted.

DE 26 28 807 A1 describes a baffle-cooling system for a turbine moving blade. The turbine moving blade comprises a blade root for fastening to a rotor of the turbine, a blade leaf for flow around by a working medium and a platform for delimiting a duct for the working medium. In the case of a gas turbine, very high temperatures occur in the duct, so that the platform surface exposed to the hot working medium is subjected to high thermal load. For cooling the platform, therefore, a perforated wall element, designated as a baffle-cooling plate, is arranged upstream of the side facing away from the hot working medium. A coolant passes through recesses (coolant leadthroughs) in the baffle-cooling plate and impinges onto that side of the platform which faces away from the working medium. Cooling of the platform is thereby achieved.

A coolable stator group for a gas turbine power plant may be gathered from U.S. Pat. No. 4,642,024. The stator group has an external air seal and also an upstream holder and a downstream holder. The holders support the external air seal with the aid of hook catches over a flow path of a hot working medium. The air seal is thereby divided structurally in three into a downstream and an upstream edge region and a central region arranged between the edge regions. For cooling the external air seal using cooling air, there is, first of all, baffle cooling in the central region. The edge regions, which cannot be acted upon directly by cooling air on account of the holders, are cooled by some of the collected cooling air being led through the holders, in order to allow a baffle cooling of the edge regions. For this purpose, metering holes extend through the holders, in order to guide the cooling air onto the upstream and the downstream edge region for the baffle cooling of the edge regions.

An improved cooling arrangement for guide rings of turbine guide blades in the gas turbine may be gathered from U.S. Pat. No. 5,649,806. A guide ring is arranged as a wall element in a gas turbine between the platforms of two turbine guide blades. The outer surface of the guide ring is exposed to the hot gas and is spaced in the radial direction from the outer ends of the turbine moving blades by a gap. A discharge of heat by convective cooling and by baffle cooling becomes possible through cooling ducts within the guide ring wall exposed to the hot gas.

Furthermore, the guide ring has cooling-air slots specially configured in relation to the outer surface. These are oriented in such a way that the cooling air is led in the direction of flow of the hot gas onto the outer surface with minimal movement exchange between the cooling air and the hot gas. Film cooling of the surface exposed to the hot gas is thereby brought about.

A baffle-cooling device for an aircraft engine component, for example a compressor part of an aircraft engine, may be gathered from EP 0 624 757 A1. The baffle-cooling device comprises a corrugated plate with a multiplicity of wave crests extending parallel to a preferential axis and wave troughs adjacent to these, which in each case have a trapezoidal contour. The wave troughs are provided, here, with baffle-cooling bores. The wave troughs and wave crests form cooling ducts which extend parallel to the preferential axis and are flow-connected to the compressor part. Weblike distributor plates are arranged perpendicularly to the preferential axis, the distributor plates in each case being connected at their upper edge to the perforated corrugated plate and at their lower edge to the compressor outlet tube. By use of the distributor plates, after a baffle cooling of the compressor tube the air is first guided perpendicularly to the preferential axis and is thereafter distributed to the cooling ducts. A feedback or intermixing of already diverted air with the air supplied for baffle cooling is thereby likewise to be prevented.

A baffle-cooling device with a perforated uniaxial corrugated plate of trapezoidal configuration, similar to that in EP 0 624 757 A1, is described in U.S. Pat. No. 5,467,815. Here, the baffle-cooling plate is arranged, spaced, opposite a wall, to be cooled, of a combustion chamber. After a baffle cooling of the wall by means of cooling air, the air passes into regions of the wave crests having an enlarged flow cross section, where the air is led further on along the axis. This does not prevent influence from being exerted on baffle-cooling air from baffle-cooling holes adjacent to one another, since an unimpeded overflow is possible.

SUMMARY OF THE INVENTION

An object of the invention is to create an improved device for a component to be cooled, with a baffle-cooling plate capable of being acted upon by a coolant. In one embodiment, the device is intended to bring about improved baffle cooling for the component to be cooled and to allow a more efficient use of coolant.

This object is achieved, according to one embodiment of the invention, by a device for a component to be cooled, with a baffle-cooling plate capable of being acted upon by a coolant and having a coolant leadthrough. In one embodiment, the baffle-coolant plate can be arranged upstream of the component to be cooled, and a diversion duct for the coolant can be provided, next to the coolant leadthrough, between the baffle-cooling plate and the component to be cooled. Further, the baffle-cooling plate can include a further coolant leadthrough, with the diversion duct including a flow barrier for the coolant between the coolant leadthrough and the further coolant leadthrough.

In baffle cooling, normally, a coolant is guided through a multiplicity of coolant leadthroughs in a panel or plate (baffle-cooling plate) which is adjacent to the surface, to be cooled, of the component to be cooled. Consequently, the coolant impinges in a corresponding multiplicity of coolant jets essentially perpendicularly onto the surface to be cooled. During interaction with a surface to be cooled, the coolant absorbs heat which, as a result of heat transfer, is transmitted from the component subjected to thermal load to the coolant. As a result of this interaction, the coolant is heated up. The cooling efficiency in the case of baffle cooling is higher than, for example, in conventional convection cooling, in which the coolant is led essentially parallel to the component surface to be cooled. Effective cooling of the component is achieved by baffle cooling. The component can thereby be exposed to higher temperatures, since, with the same introduction of heat into the component, the component can be maintained at a lower material temperature, as compared with other cooling methods.

An embodiment of the invention proceeds from the finding that, with regard to the conventional cooling concepts which, by baffle cooling, baffle-cool a component having a surface to be cooled, extensive regions, in which the coolant has high flow velocities, occur along the surface to be cooled, below the baffle-cooling plate, between the latter and the component to be cooled. The coolant flow in this case can take place essentially perpendicularly to the coolant jets which expand, nozzle like, out of coolant leadthroughs in the baffle-cooling plate in a direction toward the component surface to be cooled. It is shown that, due to the flow passing transversely around the coolant jets, these can be appreciably disturbed in their character as a nozzle jet, in particular in the immediate vicinity of the component surface to be cooled, where this effect produces a particularly adverse action. The transverse flow leads, in interaction with a coolant jet, to turbulences which lower the average temperature of the coolant in the coolant jet. A reduced cooling efficiency occurs, as compared with the situation without a disturbing transverse flow.

An embodiment of the invention shows a way of markedly reducing the transverse flow along a baffle-cooled surface of a component in the region of the nozzle expansion of a coolant jet. The device can provide, for this purpose, a diversion duct which diverts the coolant after a baffle cooling of the component has taken place. The diversion duct has a flow barrier between the coolant leadthrough and a further coolant leadthrough. The transverse flow is thereby considerably reduced in the region of the coolant jets. The diversion duct is provided next to the coolant leadthrough, so that, after a baffle cooling of the component, the coolant passes directly into the diversion duct. The flow of the coolant is thus chaneled, and the baffle-cooling action of the coolant jets, which expand, nozzle like, out of the coolant leadthroughs in a direction toward the component surface to be cooled, is increased as a result of the reduced transverse flow. By virtue of the flow barrier according to the invention, a region with a considerably reduced flow cross section for the coolant is provided between the coolant leadthrough and a further coolant leadthrough. Advantageously, the flow barrier of the diversion duct may be configured in such a way that a direct flow of coolant from the coolant leadthrough to the further coolant leadthrough is virtually no longer possible. Mutual influence exerted on coolant jets which expand in the form of nozzle jets out of the coolant leadthrough and the further coolant leadthrough for the baffle cooling of the component is thereby largely reduced. A transverse flow having an adverse influence on baffle-cooling efficiency cannot build up. Virtually undisturbed nozzle-jet expansion is ensured.

It is of great advantage that a specific reuse of the coolant is made possible by the channeling of the coolant flow in the diversion duct. The diversion duct serves in this case, on the one hand, as a collecting duct for the coolant and, on the other hand, as a flow duct. After the coolant has been utilized for the baffle cooling of the component, the coolant can be guided further on to a desired region by the diversion duct between the baffle-cooling plate and the component to be cooled and be used for further cooling purposes. For example, the diversion duct may be configured in such a way that it guides the coolant along the component, in particular along the surface of the component, with the result that convective cooling is achieved. Furthermore, the coolant may be guided through the diversion duct to other regions of the same component, in order to be used there for further cooling purposes. Moreover, it is possible, with the aid of the diversion duct, to guide the coolant to a further component, in order to use it there for cooling the further component. Utilizable cooling mechanisms which come under consideration in this context are, above all, in addition to further baffle cooling, convective cooling and also film cooling. The device thus makes it possible to have a marked increase in efficiency in the baffle cooling of a component and, in particular, a possibility for the specific reuse of a coolant after baffle cooling.

Preferably, a further coolant leadthrough is provided, which is located opposite the coolant leadthrough on the far side of the diversion duct. A further possibility for the baffle cooling of the component is made available by the further coolant leadthrough. At the same time, the diversion duct can thereby be fed with coolant from two sides. As a result, the device is advantageously configured in such a way that at least two coolant leadthroughs are assigned to the diversion duct. It is therefore not necessary to provide a separate diversion duct specifically for each coolant leadthrough.

A plurality of coolant leadthroughs are preferably arranged parallel to the diversion duct. A plurality of coolant leadthroughs are thus present along the diversion duct and are assigned to the latter. That is to say, after a baffle cooling of the component has taken place by coolant jets from the coolant leadthroughs, the coolant passes into the diversion duct. The diversion duct is in this case fed with coolant by a plurality of coolant leadthroughs. This means a highly efficient utilization of the diversion duct. Consequently, a corresponding quantity of coolant is collected and diverted in the diversion duct.

In a preferred embodiment, a plurality of diversion ducts are provided. With an appropriate number and arrangement of coolant leadthroughs in the baffle-cooling plate, it is advantageous to have a plurality of diversion ducts available. Thus, the number and arrangement of diversion ducts can be adapted specifically and efficiently, depending on the number and arrangement of coolant leadthroughs. The diversion ducts are in this case advantageously arranged over a large area along the component surface to be cooled by means of baffle cooling. The plurality of diversion ducts ensures that, after baffle cooling of the component has taken place, the coolant consisting of a coolant jet is diverted at least via one diversion duct. A transverse flow which would have an adverse influence on the efficiency of the baffle cooling is thus largely prevented in the region of the entire baffle-cooled surface of the component.

The diversion ducts preferably extend along a longitudinal axis. The longitudinal axis therefore forms a preferential direction along which the diversion ducts preferably extend. A plurality of diversion ducts may in this case advantageously be formed in parallel along the longitudinal axis. The coolant can thereby be led further on specifically along this longitudinal axis. In the sum of the coolant streams in the individual diversion ducts, a sufficient quantity of coolant can thus be guided in a preferred direction, if appropriate for cooling the component or a further component adjacent to the component along the longitudinal axis. The coolant can then be used there for further cooling purposes.

In a preferred embodiment, the diversion duct has a flow barrier for coolant between two adjacent coolant leadthroughs. By two adjacent coolant leadthroughs are meant, in this case, two coolant leadthroughs which are arranged successively along the diversion duct, the coolant leadthroughs being arranged on the same side of the diversion duct with respect to the diversion duct.

The flow barrier produces a region with a markedly reduced flow cross section between the adjacent coolant leadthroughs. The flow barrier is advantageously configured in such a way that a flow of coolant from a first coolant leadthrough to a second coolant leadthrough adjacent to the first coolant leadthrough is virtually no longer possible. Mutual influence exerted on coolant jets which expand, nozzlelike, out of the adjacent coolant leadthroughs for the baffle cooling of the component is thereby largely reduced. In particular, a transverse flow having an adverse influence on baffle-cooling efficiency virtually cannot build up. Advantageously, a more efficient feed of coolant to the diversion duct is also achieved by means of this configuration.

Preferably, the diversion duct is formed by the baffle-cooling plate, in particular by a wavy bending of the baffle-cooling plate. The diversion duct is consequently an integral part of the baffle-cooling plate. Advantageously, therefore, there is no need to produce a separate additional component which forms the diversion duct and to equip the device with it. Conventional devices for baffle cooling can therefore be equipped in a simple way with a baffle-cooling plate forming a diversion duct, in order to achieve improved baffle cooling. By the diversion duct being formed by the baffle-cooling plate, a conventional baffle-cooling plate in a device for a component to be cooled can be exchanged for the baffle-cooling plate with the diversion duct. The conversion costs are therefore negligible, as compared with the advantages of the novel cooling concept.

The baffle-cooling plate is preferably in one piece. By virtue of this configuration, the baffle-cooling plate can be produced in a simple way and particularly cost-effectively. The baffle-cooling plate can, for example, be manufactured from a sheet-metal blank by customary production methods, for example by deep-drawing. The coolant leadthroughs and the final shaping can be carried out, for example, by stamping in a stamping machine. By virtue of the one-piece design, the diversion duct together with the flow barrier is a fixed integral part of the baffle-cooling plate. It is of great advantage that the diversion duct can be produced together with the baffle-cooling plate by virtue of an appropriate shaping of the baffle-cooling plate. The diversion duct can be manufactured, for example, by means of the wavy bending of the baffle-cooling plate. Welded or other connections between the baffle-cooling plate and the diversion duct are therefore dispensed with. The wavy bending may in this case take place along two preferential axes, so that a relief-shaped wavy structure with wave crests and wave troughs is formed in two dimensions. A baffle-cooling plate configured in this way has high thermomechanical elasticity and is particularly suitable for high-temperature applications, in particular in a gas turbine. In this particularly preferred embodiment, the baffle-cooling plate has a deformation tolerance in a plurality of dimensions which is highly advantageous for the high-temperature application.

The baffle-cooling plate is preferably produced from a high-temperature-resistant material. Among materials which come under consideration are, in particular, high-temperature-resistant steels or alloys on a nickel, iron or chromium base. The baffle-cooling plate with the diversion duct is thereby advantageously designed for high-temperature applications, that is to say for cooling components subjected to high thermal load.

Preferably, the component to be cooled is a component, subjected to high thermal load, of a thermal machine, in particular of a gas turbine. Also preferably, the component to be cooled is a platform of a turbine blade or a heat-shield element of a combustion chamber of a gas turbine. Turbine blades which come under consideration in this context are both turbine guide blades and turbine moving blades. Further applications of the device, for example for the baffle cooling of wall elements in furnaces or for the cooling of engines and working machines, are possible.

BRIEF DESCRIPTION OF THE DRAWINGS

The device for a component to be cooled is explained in more detail below with reference to the exemplary embodiments illustrated in the diagrammatic and simplified drawings, in which.

The same reference symbols have the same significance in the figures.

DETAILED DESCRIPTION OF THE PREFERRED EMBODIMENTS

Figure 1:
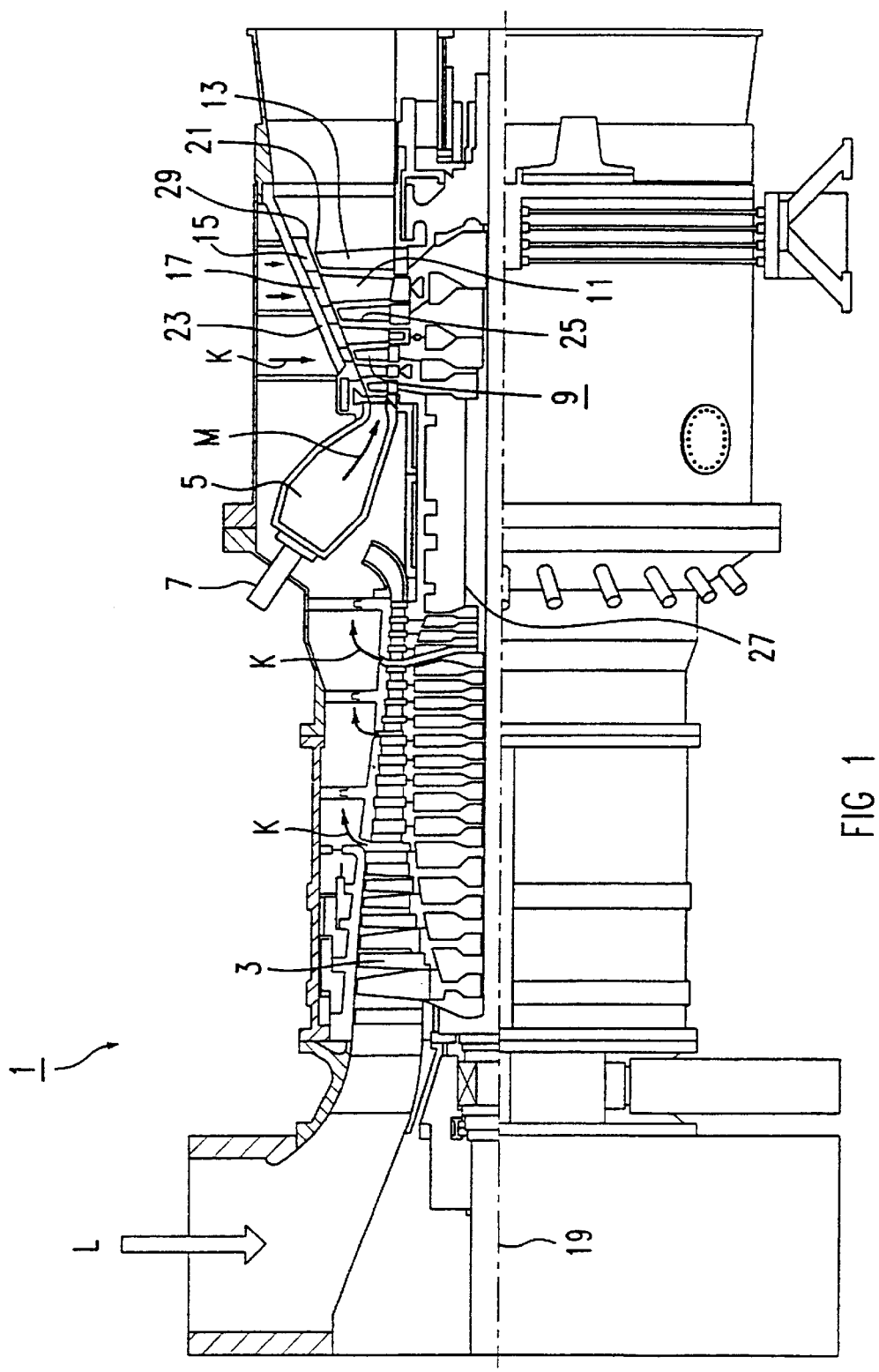
FIG. 1 shows a gas turbine with compressor, combustion chamber and turbine.

FIG. 1 illustrates a half section through a gas turbine 1. The gas turbine 1 includes a compressor 3 for combustion air, a combustion chamber 5 with a burner 7 for a liquid or gaseous fuel and a turbine 9 for driving the compressor 3 and a generator which is not illustrated in FIG. 1. In the turbine 9, stationary guide blades 11 and rotatable moving blades 13 are arranged on respective radially extending rings, not shown in the half section, along the axis of rotation 19 of the gas turbine 1.

In this case, a pair, successive along the axis of rotation 19, of a ring of guide blades 11 (guide blade ring) and a ring of moving blades 13 (moving blade ring) is designated as a turbine stage. Each guide blade 11 has a platform 17 which is arranged for fixing the respective guide blade 11 to the inner turbine casing 23. The platform 17 in this case constitutes a wall element in the turbine 9. The platform 17 is a component 17 which is subjected to high thermal load and which forms the outer boundary for a hot medium M, in particular of the hot-gas duct 25, in the turbine 9. The moving blade 13 is fastened on the turbine rotor 27 arranged along the axis of rotation 19 of the gas turbine 1. A guide ring 15 is arranged as a wall element in the gas turbine 1 between the platforms 17 of two axially spaced adjacent guide blades 11. The guide ring 15 and the platform 17 of the guide blade 11 in each case have a hot side 29 which is exposed to the hot medium M, in particular the hot gas M, when the gas turbine 1 is in operation. The hot side 29 of the guide ring 15 is in this case spaced in the radial direction from the outer end 21 of the moving blade 13 by a gap. The platform 17 of the guide blade 11 and the guide ring axially adjacent to the platform 17 in each case constitute coolable components 17 which are acted upon by a coolant K for cooling purposes.

When the gas turbine 1 is in operation, fresh air L is sucked in from the surroundings. The air L is compressed in the compressor 3 and is thereby simultaneously preheated. In the combustion chamber 5, the air L is combined with the liquid or gaseous fuel and is burnt. Part of the air L, the part being previously extracted from the compressor 3 at suitable extraction points, serves as cooling air K for cooling the turbine stages, for example, the first turbine stage being subjected to a turbine inlet temperature of approximately 750° C. to 1200° C. In the turbine 9, an expansion and cooling of the hot medium M, in particular of the hot gas M, take place, the latter flowing through the turbine stages.

The component 17 to be cooled, in particular the platform 17 of the guide blade 11, is acted upon, for cooling purposes, by a coolant K, in particular by the cooling air K, from that side of the platform 17 which is located opposite the hot side 29 of the platform 17. The platform 17 is in this case cooled by baffle cooling.

Figure 2:
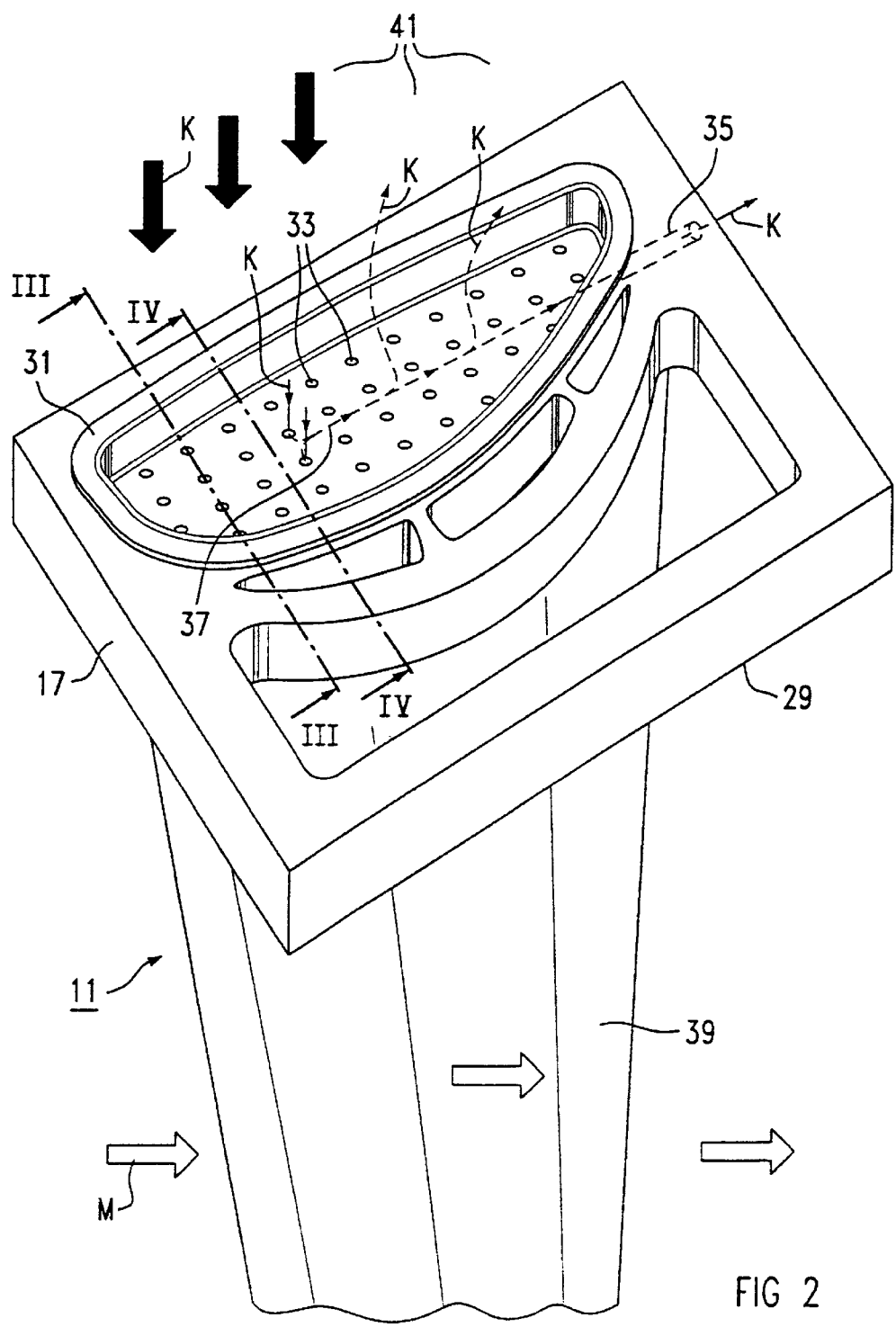
FIG. 2 shows a perspective illustration of a turbine guide blade with a baffle-cooling plate.

FIG. 2 shows a perspective illustration of a turbine guide blade 11. The turbine guide blade 11 has a platform 17 and a blade leaf 39 connected to the platform 17. The platform 17 possesses a hot side 29 which is acted upon by a hot medium M when the gas turbine 1 is in operation. The platform 17 is a component 17 which is subjected to high thermal load and which is cooled by means of baffle cooling. A tub-shaped baffle-cooling plate 31 is arranged on that side of the platform 17 which is located opposite the hot side 29. The baffle-cooling plate 31 has an inflow side 41. The baffle-cooling plate 31 can be acted upon by a coolant K from the inflow side 41 for the baffle cooling of the platform 17. This is marked by thick arrows. The baffle-cooling plate 31 is arranged upstream of the platform 17 to be cooled, in the direction of flow of the coolant K. The baffle-cooling plate 31 has a holelike coolant leadthrough 33, the coolant leadthrough 33 being one of a plurality of coolant leadthroughs 33. Between the baffle-cooling plate 31 and the component 17 to be cooled, in particular the platform 17, a diversion duct 37 for the coolant K is provided next to the coolant leadthrough 33. The diversion duct 37 serves for diverting the coolant K after the baffle cooling of the platform 17 has taken place.

During the baffle cooling, the baffle-cooling plate 31 is acted upon by the coolant K under high pressure on the inflow side 41. The coolant K flows through the coolant i leadthroughs 33 and according to the number and arrangement of the coolant leadthroughs 33, forms a multiplicity of coolant jets on that side of the baffle-cooling plate 31 which faces away from the inflow side 41. These coolant jets impinge onto the platform 17, the coolant K absorbing heat from the platform 17, which, as a result of thermal conduction, is guided from the hot side 29, acted upon by the hot medium M, to that side of the platform 17 which is located opposite the hot side 29. As a result of baffle cooling by the coolant K, the coolant K is heated up, the temperature of the coolant K rising correspondingly. After baffle cooling, the coolant K is diverted through the diversion duct 37. The coolant K is led further on specifically into different regions of the platform 17, depending on the arrangement and configuration of the diversion duct 37. The coolant K is in this case used preferably for further cooling of the platform 17 or of a further component adjacent to the platform 17 and not shown in FIG. 2. Cooling mechanisms coming under consideration in this case, in addition to baffle cooling, are also convective cooling or film cooling. For cooling a further component adjacent to the platform 17, for example a further platform 17, adjacent to the platform 17, of a turbine guide blade 11, the coolant K is led through a suitable passage duct 35 in the platform 17. The coolant K flows through the passage duct 35 to the further component for the purpose of cooling the latter. The passage duct 35 is in this case, for example, a simple bore in the platform 17.

Figure 3:
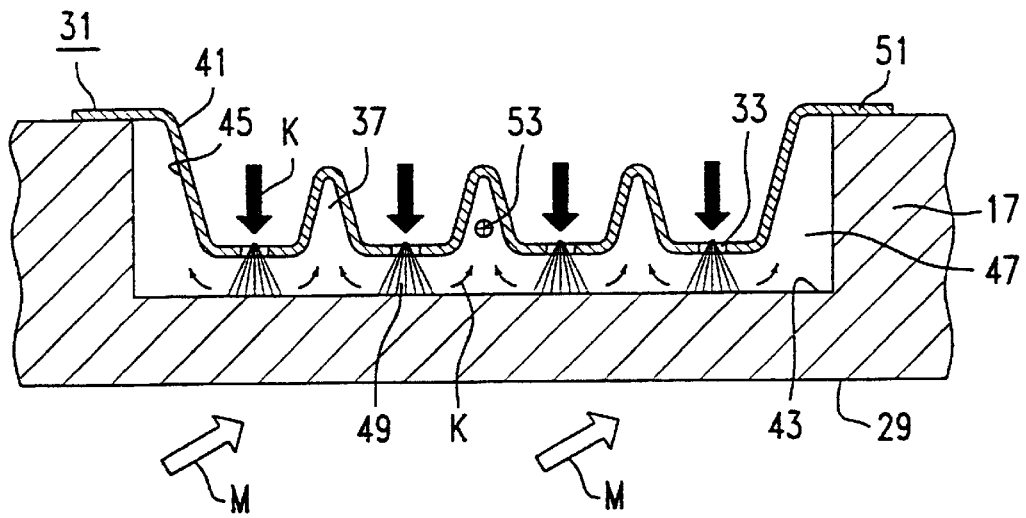
FIG. 3 shows a view of a detail of the turbine guide blade shown in FIG. 2, along the sectional line III—III.

FIG. 3 shows a view of a detail of the turbine guide blade 11 shown in FIG. 2, along the sectional line III—III. The baffle-cooling plate 31 comprises a wavy wall 51 with an inflow side 41 capable of being acted upon by the coolant K and with an outflow side 45 located opposite the inflow side 41. The outflow side 45 is followed by a cooling region 47 which is formed between the cooling surface 43, to be cooled, of the component 17 and the outflow side 45. The wall 51 has a plurality of coolant leadthroughs 33 passing through the wall 51. The coolant leadthrough 33 is followed in the cooling region 47 by a nozzle expansion region 49.

A division duct 37 for coolant K is formed along the wall 51 in the cooling region 47. The diversion duct 37 is arranged next to the coolant leadthrough 33. In this case, the diversion duct 37 is one of a plurality of diversion ducts 37, and the coolant leadthrough 33 is one of a plurality of coolant leadthroughs 33. The diversion duct 37 is formed by the baffle-cooling plate 31 and extends parallel to a longitudinal axis 53.

The baffle-cooling plate 31 is produced in one piece with the diversion duct 37. The baffle-cooling plate 31 is arranged in such a way that the outflow side 45 of the baffle-cooling plate 31 is located opposite the cooling surface 43 of the platform 17.

When the gas turbine 1 (cf. FIG. 1), not shown in any more detail in FIG. 3, is in operation, the hot side 29 of the platform 17 is acted upon by the hot medium M, in particular the hot gas M. In order to withstand the high temperatures, the platform 17 has to be cooled. In the baffle cooling of the platform 17, the inflow side 41 of the baffle-cooling plate 31 is acted upon by the coolant K under suitable pressure. The coolant K passes from the inflow side 41 through the coolant leadthroughs 33 in each case into the nozzle expansion region 49. The coolant K expands in the form of a nozzle jet in the nozzle expansion region 49 in the direction of the platform 17 to be cooled and impinges in a plurality of coolant jets against the cooling surface 43. In this case, the platform 17 is efficiently baffle-cooled on the cooling surface 43. As a result of interaction with the cooling surface 43, the coolant K absorbs heat which, as a result of thermal conduction, is transported from the hot side 29 to the cooling surface 43 located opposite the hot side 29. As a result of baffle cooling, the coolant K heats up.

After the baffle cooling of the platform 17, the coolant K passes from the nozzle expansion region 49 to a diversion duct 37. The coolant K is collected in the diversion duct 37; it is available for further cooling purposes. For example, the coolant K can be diverted parallel to the longitudinal axis 53 and, if appropriate, used for cooling the platform 17 in another region and/or for cooling a further component which is not illustrated in any more detail in FIG. 3 and which is adjacent to the platform 17. The further component may be, for example, a platform 17 of a further turbine guide blade 11 or a guide ring 15 (cf. FIG. 1). Cooling mechanisms coming under consideration, which can be utilized in this context, are, in addition to further baffle cooling, convective cooling and film cooling. The plurality of diversion ducts 37 ensure that, after the baffle cooling of the platform 17 has taken place, the coolant K is diverted out of the nozzle expansion region 49 at least via one of the diversion ducts 37. A flow, transverse to the coolant jets, along the cooling surface 43, which would have an adverse influence on the baffle-cooling efficiency, can thus be largely reduced in the nozzle expansion region 49.

Figure 4:
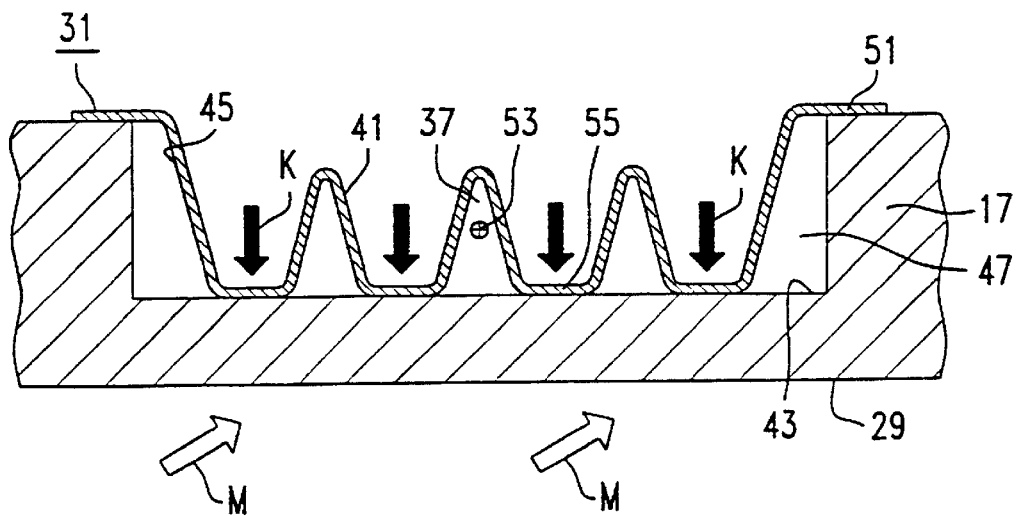
FIG. 4 shows a view of a detail of the turbine guide blade shown in FIG. 2, along the sectional line IV—IV.

FIG. 4 illustrates a view of a detail of the turbine guide blade 11 shown in FIG. 2, along the sectional line IV—IV. The sectional line IV—IV in this case follows the sectional line II—II axially along the longitudinal axis 53 (cf. FIG. 3). The sectional line IV—IV in this case forms a transverse axis which extends essentially perpendicularly to the longitudinal axis 53 and along which no coolant leadthrough 33 is arranged. The diversion duct 37 has a flow barrier 55. In this case, the diversion duct 37 together with the flow barrier 55 is formed by the baffle-cooling plate 31. The flow barrier 55 is configured in such a way that the outflow side 45 of the baffle-cooling plate 31 is in contact with the cooling surface 43 of the platform 17. As a result, the flow barrier 55 for coolant K is formed between two coolant leadthroughs 33 adjacent along the longitudinal axis 53.

By two adjacent coolant leadthroughs 33 are meant, in this context, two coolant leadthroughs 33 which are arranged successively along the diversion duct 37. The flow barrier 55 seals off relative to one another the nozzle expansion regions 49 assigned in each case to the adjacent coolant leadthroughs 33. This prevents coolant K from flowing over from one nozzle expansion region 49 to a further nozzle expansion region 49 adjacent along the longitudinal axis 53. The more sealingly the flow barrier 55 seals off, the more effectively a possible disturbing transverse flow is reduced. With the flow barrier 55 having an appropriately high sealing action, a transverse flow having an adverse influence on baffle-cooling efficiency virtually cannot build up. It is of great advantage that this configuration also ensures a particularly efficient feed of coolant K to the diversion duct 37.

The invention is distinguished in that markedly improved baffle cooling and a more efficient use of coolant, as compared with conventional baffle-cooling arrangements, become possible for a component to be cooled. The baffle-cooling plate is configured in a suitable way, so that a transverse flow, in particular in the nozzle expansion region of the coolant jets, is largely prevented in the cooling region which is formed between the baffle-cooling plate and the component to be cooled. As compared with conventional devices for baffle cooling, by the cooling concept specified the component can be maintained at a predetermined material temperature with a smaller amount of coolant being used. This increase in efficiency is associated with an increase in efficiency when the device is used in a thermal machine.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A device for a component to be cooled, comprising:

a baffle-cooling plate capable of being acted upon by a coolant and including at least one coolant leadthrough, the baffle-cooling plate being arranged upstream of the component to be cooled; and a diversion duct for the coolant, provided next to the coolant leadthrough and between the baffle-cooling plate and the component to be cooled, wherein the baffle-cooling plate further includes a further coolant leadthrough which is arranged adjacent to the at least one coolant leadthrough, and wherein the diversion duct includes a flow barrier for the coolant, between the at least one coolant leadthrough and the further coolant leadthrough, to preclude a direct flow of coolant from the at least one coolant leadthrough to the further coolant leadthrough.

2. The device as claimed in claim 1, wherein the at least one coolant leadthrough includes a plurality of coolant leadthroughs arranged parallel to the diversion duct.

3. The device as claimed in claim 1, wherein a plurality of diversion ducts are provided.

4. The device as claimed in claim 3, wherein the diversion ducts extend along a longitudinal axis.

5. The device as claimed in claim 1, wherein the component to be cooled forms a component, subjected to high thermal load, of a thermal machine.

6. The device as claimed in claim 1, wherein the component to be cooled forms a component, subjected to high thermal load, of a gas turbine.

7. The device as claimed in claim 1, wherein the component to be cooled is a platform of a turbine blade.

8. The device as claimed in claim 7, wherein a plurality of diversion ducts are provided.

9. The device as claimed in claim 8, wherein the diversion ducts extend along a longitudinal axis.

10. The device of claim 1, wherein the component to be cooled is a heat-shield element in a combustion chamber of a gas turbine.

* * * * *